(12) United States Patent
Shindome et al.

(10) Patent No.: US 6,485,842 B1
(45) Date of Patent: Nov. 26, 2002

(54) RESIN COMPOSITION COMPRISING ETHYLENE-VINYL ALCOHOL COPOLYMER WITH GOOD INTERLAYER ADHESIVENESS

(75) Inventors: Hiroyuki Shindome, Kurashiki (JP); Naokiyo Inomata, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 159 days.

(21) Appl. No.: 09/612,455

(22) Filed: Jul. 7, 2000

(30) Foreign Application Priority Data

Jul. 7, 1999 (JP) .......................................... 11-192844
Sep. 7, 1999 (JP) .......................................... 11-253516

(51) Int. Cl.$^7$ .............................................. B32B 27/18
(52) U.S. Cl. ........................ 428/522; 428/520; 524/394; 524/464; 524/414
(58) Field of Search ................................ 428/520, 522, 428/36.6, 36.7; 524/284, 404, 405, 414, 417, 394; 525/56, 60, 61

(56) References Cited

U.S. PATENT DOCUMENTS 6,242,087 B1 * 6/2001 Kawai ........................ 428/336
2001/0025087 A1 * 9/2001 Kazeto et al. ............ 525/330.6

FOREIGN PATENT DOCUMENTS

| EP | 0 308 703 | 3/1989 |
| EP | 0 930 339 | 7/1999 |
| EP | 1 036 652 | 9/2000 |
| WO | WO 99/05213 | 2/1999 |
| WO | WO 00/20211 | 4/2000 |

OTHER PUBLICATIONS

Patent Abstracts of Japan, AN 1981–41006D, JP 56–041204, Apr. 17, 1981.
Patent Abstracts of Japan, AN 1998–225236, JP 10–067898, Mar. 10, 1998.

* cited by examiner

Primary Examiner—D. Lawrence Tarazano
(74) Attorney, Agent, or Firm—Oblon, Spivak, McClelland, Maier & Neustadt, P.C.

(57) ABSTRACT

Disclosed are a resin composition comprising an ethylene-vinyl alcohol copolymer and a multi-layered structure comprising the resin composition. The resin composition comprises an ethylene-vinyl alcohol copolymer which contains from 500 to 2000 ppm, in terms of the metal, of an alkali metal salt (A) and from 0.05 to 4.5 $\mu$mols/g of a carboxylic acid (B), where the ratio of the content ($\mu$mol/g) of a carboxylic acid (b1) having a molecular weight of at least 75 and its salt to the total content ($\mu$mol/g) of the carboxylic acid (B) and its salt is at least 0.1; or comprises an ethylene-vinyl alcohol copolymer which contains from 500 to 2000 ppm, in terms of the metal, of an alkali metal salt (A), from 10 to 500 ppm of a carboxylic acid (b2) having a molecular weight of smaller than 75, and from 10 to 500 ppm, in terms of the phosphate radical, of a phosphate compound (C). The resin composition has extremely good adhesiveness, and its moldings have good appearances with few gels and fish eyes. When molded, the resin composition ensures good long-run workability and recyclability, and the recycled resin composition is yellowed little.

15 Claims, No Drawings

RESIN COMPOSITION COMPRISING ETHYLENE-VINYL ALCOHOL COPOLYMER WITH GOOD INTERLAYER ADHESIVENESS

BACKGROUND OF THE INVENTION

1. Field of the Invention

The present invention relates to a resin composition comprising an ethylene-vinyl alcohol copolymer (EVOH) and a multi-layered structure comprising the resin composition. The resin composition has extremely good adhesiveness, and its moldings have good appearances with few gels and fish eyes. When molded, the resin composition ensures good long-run workability and recyclability, and the recycled resin composition is yellowed little.

2. Description of the Related Art

EVOH is a useful polymer material having good oxygen barrier properties, oil resistance, antistatic properties and mechanical strength, and is widely used for various wrapping and packaging materials such as films, sheets, containers, etc. As being generally molded in melt into such moldings, EVOH is required to have good long-run workability in melt molding (that is, it can be molded in good moldings with neither fish eyes nor streaks even in long-run molding lines), and its moldings are required to have good appearances (that is, they have neither gels nor hard spots). Another important matter with EVOH recently discussed is its recyclability. Concretely, in case where wastes of EVOH moldings are recovered and again molded in melt through repeated heat history, they are required to have good recyclability (that is, the recovered EVOH wastes have good moldability) and the recycled EVOH moldings are required to be yellowed little.

For producing EVOH moldings with good mechanical strength, moisture resistance and heat-sealability, in general, EVOH is co-extruded together with a substrate of polyolefinic resin or the like to give multi-layered structures in which the EVOH layer and the substrate resin layer are bonded to each other via an adhesive layer therebetween. In those structures, therefore, EVOH is required to have high interlayer adhesiveness. For improving the interlayer adhesiveness of EVOH in such multi-layered structures, known is (1) a method of adding a minor component, especially an alkali metal, to EVOH. On the other hand, disclosed is (2) an EVOH composition containing from 0.0005 to 0.05% by weight (in terms of the metal) of a salt of a metal of Group 2 of the Periodic Table, from 0.002 to 0.2% by weight of an acid having pKa of at least 3.5 and a boiling point of not lower than 180° C., and from 0.01 to 0.2% by weight of an acid having pKa of at least 3.5 and a boiling point of not higher than 120° C., and having a specific melt viscosity (Japanese Patent Laid-Open No. 66262/1989). They say that the EVOH composition with such additives has improved long-run workability and its moldings have good appearances with neither gels nor fish eyes. Also disclosed is (3) an EVOH resin composition containing, relative to 100 parts by weight of EVOH therein, from 0.001 to 1 part by weight (in terms of the boron element) of a boron compound, at most 0.05 parts by weight of acetic acid, and from 0.001 to 0.05 parts by weight (in terms of the metal) of a metal acetate (EP 930339, corresponding to Japanese Patent Laid-Open No. 43571/1999). They say that the EVOH resin composition has good long-run workability in melt molding lines and gives moldings with good appearances and good interlayer adhesiveness. In Comparative Example 5 in the laid-open specification, demonstrated is a resin composition comprising 100 parts by weight of EVOH, 0.03 parts by weight (in terms of the boron element) of boric acid, 0.009 parts by weight of acetic acid and 0.08 parts by weight (in terms of sodium) of sodium acetate. They say that, though their interlayer adhesiveness is good, films of the resin composition have many streaks and fish eyes and their appearances are not good, and, in addition, the stretched films are uneven.

There is (4) still another related art disclosure of an EVOH resin composition capable of being molded in melt to give moldings with few fish eyes and having good adhesiveness (Japanese Patent Laid-Open No. 67898/1998). The EVOH resin composition contains from 100 to 5000 ppm, in terms of the free acid, of a hydroxycarboxylic acid and/or its salt, from 50 to 500 ppm, in terms of the metal, of an alkali metal salt, and from 20 to 200 ppm, in terms of the metal, of an alkaline earth metal salt.

In the related art disclosures (1) to (4), however, the interlayer adhesiveness of EVOH could not be improved to a satisfactory degree. Therefore, further improving EVOH resins to that effect is desired. In addition, heretofore, adhesive resins for nylons could not be used in multi-layered structures with EVOH, as their adhesiveness to EVOH is poor. Therefore, in case where EVOH is layered over substrates of polyolefinic resins and the like, it indispensably requires high-performance and expensive adhesive resins for its exclusive use. In that situation, the latitude in choosing the adhesive resins for EVOH is limited.

As in Comparative Example 5 in the related art disclosure (3), EVOH has good interlayer adhesiveness, but its films are still problematic in their appearances and stretchability. As in the related art disclosures discussed herein, it has heretofore been said that improving both the interlayer adhesiveness and the appearances of EVOH resin compositions and moldings is extremely difficult, and developing EVOH resin compositions and moldings having both good interlayer adhesiveness and good appearances is much desired in the art.

For recycling burrs and other wastes that will be inevitable in long-run molding lines for producing EVOH resin moldings, EVOH resin compositions and moldings are required to have not only good interlayer adhesiveness and good appearances but also good long-run workability and recyclability, and, in addition, the recycled compositions and moldings are required to be yellowed little.

To meet the requirements, desired is to provide an improved EVOH resin composition of which the advantages are that it has extremely good adhesiveness and its moldings have good appearances with few gels and fish eyes, and, when molded, it ensures good long-run workability and recyclability and the recycled resin composition is yellowed little. Also desired is to provide a multi-layered structure comprising the resin composition.

SUMMARY OF THE INVENTION

To attain the object as above, the present invention provides an EVOH resin composition containing from 500 to 2000 ppm, in terms of the metal, of an alkali metal salt (A) and from 0.05 to 4.5 $\mu$mols/g of a carboxylic acid (B), where the ratio of the content ($\mu$mol/g) of a carboxylic acid (b1) having a molecular weight of at least 75 and its salt to the total content ($\mu$mol/g) of the carboxylic acid (B) and its salt is at least 0.1.

In one preferred embodiment of the resin composition, the carboxylic acid (B) has pKa of at least 3.5. In another preferred embodiment thereof, the carboxylic acid (b1) having a molecular weight of at least 75 is a hydroxycarboxylic acid, more preferably a lactic acid.

In still another preferred embodiment, the content ($\mu$mol/g in terms of the metal) of the alkali metal salt (A) is from 10 to 100 times the content ($\mu$mol/g) of the carboxylic acid (B).

The invention also provides an EVOH resin composition containing from 500 to 2000 ppm, in terms of the metal, of an alkali metal salt (A), from 10 to 500 ppm of a carboxylic acid (b2) having a molecular weight of smaller than 75, and from 10 to 500 ppm, in terms of the phosphate radical, of a phosphate compound (C).

In one preferred embodiment of the resin composition, the content ($\mu$mol/g in terms of the metal) of the alkali metal salt (A) is from 3 to 20 times the content ($\mu$mol/g) of the carboxylic acid (b2) having a molecular weight of smaller than 75. In another preferred embodiment thereof, the carboxylic acid (b2) having a molecular weight of smaller than 75 is acetic acid.

Still another preferred embodiment of the resin composition contains from 50 to 2000 ppm of a boron compound (D). In this, preferably, the content ($\mu$mol/g, in terms of the boron element) of the boron compound (D) is from 2 to 500 times the content ($\mu$mol/g) of the carboxylic acid (B).

Still another preferred embodiment of the resin composition satisfies the following formula (1):

$$0.1 < MFRmax/MFR0 < 10 \quad (1)$$

wherein MFRmax indicates a maximum value of MFR (measured at 230° C. and under a load of 10.9 kg) of the resin composition having been subjected to heat treatment at 220° C. in a nitrogen atmosphere for a period of from 10 to 100 hours, and MFR0 indicates MFR (measured at 230° C. and under a load of 10.9 kg) of the resin composition not subjected to the heat treatment.

Still another preferred embodiment of the resin composition is for co-extrusion molding.

The invention further provides a multi-layered structure that comprises at least one layer of the above-mentioned resin composition.

DETAILED DESCRIPTION OF THE INVENTION

The EVOH resin composition which contains from 500 to 2000 ppm, in terms of the metal, of an alkali metal salt (A) and from 0.05 to 4.5 $\mu$mols/g of a carboxylic acid (B), where the ratio of the content ($\mu$mol/g) of a carboxylic acid (b1) having a molecular weight of at least 75 and its salt to the total content ($\mu$mol/g) of the carboxylic acid (B) and its salt is at least 0.1: and also the EVOH resin composition which contains from 500 to 2000 ppm, in terms of the metal, of an alkali metal salt (A), from 10 to 500 ppm of a carboxylic acid (b2) having a molecular weight of smaller than 75, and from 10 to 500 ppm, in terms of the phosphate radical, of a phosphate compound (C) both have extremely good interlayer adhesiveness, and therefore adhere extremely firmly to adhesive resins for EVOH. Accordingly, the resin composition of the invention is favorable to co-extrusion molding but are not limited thereto.

It has heretofore been said that the adhesiveness to EVOH of adhesive resins for nylons is poor, and adhesive resins for nylons could not be used in multi-layered structures with EVOH. However, since the resin composition of the invention has extremely good interlayer adhesiveness, it is favorably used even in multi-layered structures with adhesive resins for nylons, especially in co-extruded multi-layered structures with them. To the effect that the latitude in choosing the adhesive resins applicable to the resin composition of the invention is enlarged, the meaning of the invention is great.

EVOH for use in the invention is preferably obtained by saponifying an ethylene-vinyl ester copolymer. Especially preferably, it has an ethylene content of from 3 to 70 mol %. For ensuring good melt moldability of the resin composition to give moldings with good gas barrier properties, the ethylene content of EVOH preferably falls between 10 and 65 mol %, more preferably between 20 and 65 mol %, most preferably between 25 and 60 mol %. Also preferably, the degree of saponification of the vinyl ester moiety to give the vinyl alcohol moiety in EVOH is at least 80%, but more preferably at least 95% for ensuring moldings with good gas barrier properties, even more preferably at least 98%, still more preferably at least 99%. If the ethylene content of EVOH is larger than 70 mol %, the barrier properties and even the printability of the resin moldings will be poor. If the degree of saponification is smaller than 80%, the barrier properties, the heat stability and the moisture resistance of the resin moldings will be poor.

EVOH having an ethylene content of from 3 to 20 mol % is favorable to water-soluble applications. An aqueous solution of such EVOH is an excellent coating material with good stability capable of being formed into coating films with good barrier properties.

One typical example of vinyl esters to be used in producing EVOH is vinyl acetate, which, however, is not limitative. Any other vinyl esters of fatty acids (e.g., vinyl propionate, vinyl pivalate, etc.) are usable herein. EVOH may contain from 0.0002 to 0.2 mol % of a vinylsilane compound serving as a comonomer. The vinylsilane compound includes, for example, vinyltrimethoxysilane, vinyltriethoxysilane, vinyltri($\beta$-methoxyethoxy)silane, $\gamma$-methacryloxypropylmethoxysilane, etc. Of those, preferred are vinyltrimethoxysilane and vinyltriethoxysilane.

The method of producing EVOH for use in the invention is described concretely. To produce it, for example, ethylene is polymerized with vinyl acetate in any desired manner of not only solution polymerization but also suspension polymerization, emulsion polymerization or bulk polymerization and in any desired mode of continuous or batchwise polymerization. One example of batchwise solution polymerization to produce the polymer is described, for which the polymerization condition is as follows.

Solvent

Alcohols are preferred, but any other organic solvents (e.g., dimethylsulfoxide, etc.) capable of dissolving ethylene, vinyl esters and ethylene-vinyl ester copolymers may also be used. Alcohols usable herein include methyl alcohol, ethyl alcohol, propyl alcohol, n-butyl alcohol, t-butyl alcohol, etc. Especially preferred is methyl alcohol.

Catalyst

Usable are azonitrile-type initiators such as 2,2-azobisisobutyronitrile, 2,2-azobis-(2,4-dimethylvaleronitrile), 2,2-azobis-(4-methoxy-2,4-dimethylvaleronitrile), 2,2-azobis-(2-cyclopropylpropionitrile), etc.; organic peroxide-type initiators such as isobutyryl peroxide, cumyl peroxyneodecanoate, diisopropylperoxycarbonate, di-n-propyl peroxydicarbonate, t-butyl peroxyneodecanoate, lauroyl peroxide, benzoyl peroxide, t-butyl hydroperoxide, etc.

Temperature 20 to 90° C., preferably 40 to 70° C.

Time 2 to 15 hours, preferably 3 to 11 hours. With continuous polymerization, the average residence time in the polymerization vessel is desirably about the same.

Degree of Polymerization 10 to 90%, preferably 30 to 80% based on the vinyl ester fed into the reactor.

Resin Content of the Solution After Polymerization 5 to 85%, preferably 20 to 70%.

Ethylene Content of Copolymer

Preferably 3 to 70 mol %, more preferably 10 to 65 mol %, even more preferably 20 to 65 mol %, still more preferably 25 to 60 mol %.

Except for ethylene and vinyl acetate, any other minor comonomers capable of copolymerizing with them may be present in the polymerization system. The comonomers include, for example, α-olefins such as propylene, isobutylene, α-octene, α-dodecene, etc.; unsaturated acids such as acrylic acid, methacrylic acid, crotonic acid, maleic acid, itaconic acid, etc., and their anhydrides, salts, or mono- or di-alkyl esters, etc.; nitriles such as acrylonitrile, methacrylonitrile, etc.; amides such as acrylamide, methacrylamide, etc.; olefinsulfonic acids such as ethylenesulfonic acid, allylsulfonic acid, methallylsulfonic acid, etc., and their salts; alkyl vinyl ethers, vinyl ketones, N-vinylpyrrolidone, vinyl chloride, vinylidene chloride, etc.

After the monomers have been polymerized for a predetermined period of time to give the intended copolymer having a predetermined degree of polymerization, a polymerization inhibitor may be added thereto, if desired. Then, the non-reacted ethylene gas is evaporated away, and the non-reacted vinyl acetate is purged away. To purge the ethylene-vinyl acetate copolymer from the non-reacted vinyl acetate after the removal of ethylene from the copolymer through evaporation, for example, the copolymer solution is continuously run into a column filled with raschig rings, in the downward direction at a constant flow rate, while a vapor of an organic solvent such as methanol or the like is jetted into the column from its bottom, whereby a mixed vapor of the organic solvent such as methanol or the like and the non-reacted vinyl acetate is run off from the column through its top, and the copolymer solution from which the non-reacted vinyl acetate was removed is taken out of the column through its bottom.

An alkali catalyst is added to the copolymer solution from which the non-reacted vinyl acetate was removed, and it saponifies the vinyl acetate moiety of the copolymer. For this, employable is any of continuous or batchwise saponification. The alkali catalyst includes, for example, sodium hydroxide, potassium hydroxide, alkali metal alcoholates, etc. One example of batchwise saponification is described, for which the condition is as follows.

Concentration of copolymer solution:

10 to 50%.

Reaction temperature:

30 to 60° C.

Amount of catalyst to be used:

0.02 to 0.6 equivalents (based on the vinyl acetate moiety).

Time:

1 to 6 hours.

The degree of saponification of the saponified copolymer will vary, depending on the object of the copolymer, but is preferably at least 80% of the vinyl acetate moiety, more preferably at least 95% thereof, even more preferably at least 98% thereof, still more preferably at least 99% thereof. The degree of saponification could be varied in any desired manner by controlling the condition for saponification.

After having been thus processed, the resulting ethylene-vinyl alcohol copolymer is optionally but preferably neutralized and then washed to remove the alkali catalyst, by-produced salts and other impurities therefrom.

In the EVOH resin composition of the invention, the content of the alkali metal salt (A) falls between 500 and 2000 ppm in terms of the metal. In this, it is important that the content of the alkali metal salt (A) is at least 500 ppm (in terms of the metal). Having the specific constitution, the EVOH resin composition ensures extremely good adhesiveness. The alkali metal salt (A) is not specifically defined, including, for example, sodium salts, potassium salts, etc. The anion of the alkali metal salt (A) is not also specifically defined. Preferred are acetate, phosphate and lactate anions; and more preferred are lactate and acetate anions.

If the content of the alkali metal salt (A) in the composition is smaller than 500 ppm, the adhesiveness of the composition is poor. In particular, the adhesiveness to poorly adhesive resins such as those for nylons is poor in co-extrusion molding of the composition. On the other hand, if the content of the alkali metal salt (A) is larger than 2000 ppm, the resin composition will greatly discolor when it is melted. Preferably, the lowermost limit of the content of the alkali metal salt (A) in the resin composition of the invention is at least 510 ppm, more preferably at least 520 ppm, even more preferably at least 530 ppm. On the other hand, the uppermost limit of the content of the alkali metal salt (A) therein is preferably at most 1500 ppm, more preferably at most 1000 ppm, even more preferably at most 750 ppm.

The carboxylic acid (B) for use in the invention is trouped into two, one being a carboxylic acid (b1) having a particular weight of at least 75, and the other being a carboxylic acid (b2) having a molecular weight of smaller than 75. The carboxylic acid (b1) having a molecular weight of at least 75 includes, for example, succinic acid, adipic acid, benzoic acid, capric acid, lauric acid, glycolic acid, lactic acid, etc. In case where a dicarboxylic acid such as succinic acid, adipic acid or the like is used, the resin moldings will often have gels and fish eyes. As opposed to this, a hydroxycarboxylic acid such as glycolic acid, lactic acid or the like is preferred, as being free from the problem and having good solubility in water. Especially preferred is lactic acid. More preferably, the carboxylic acid (b1) has a molecular weight of at least 80, even more preferably at least 85, still more preferably at least 90. It is desirable to add such a carboxylic acid having a higher molecular weight to the resin composition, since, in the resin composition, the amount of the volatile component that may evaporate while the resin composition is molded could be reduced, and the resin composition stinks little and has good long-run workability.

The carboxylic acid (b2) having a molecular weight of smaller than 75 includes, for example, formic acid, acetic acid, propionic acid, etc. Especially preferred is acetic acid, as it is inexpensive and its acidity is suitable for use herein. Containing acetic acid, the pH of the resin composition is easy to control.

Preferably, the carboxylic acid (B) for use in the invention has pKa of at least 3.5 at 25° C. Containing a carboxylic acid having pKa of smaller than 3.5 at 25° C., the pH of the EVOH resin composition will be difficult to control, and, in addition, the discoloration resistance and the interlayer adhesiveness of the resin composition will be poor.

In case where the ratio of the content ($\mu$mol/g) of the carboxylic acid (b1) having a molecular weight of at least 75 and its salt to the total content ($\mu$mol/g) of the carboxylic acid (B) and its salt in the resin composition is at least 0.1, the content of the carboxylic acid (B) must fall between 0.05 and 4.5 $\mu$mols/g. If the content of the carboxylic acid (B) is smaller than 0.05 $\mu$mols/g, the resin composition will greatly discolor when it is melted. On the other hand, if the content is larger than 4.5 $\mu$mols/g, adhesiveness of the resin composition to adhesive resins will be poor when the resin composition is molded through co-extrusion. Preferably, the lowermost limit of the content of the carboxylic acid (B) is at least 0.1 μmols/g, more preferably at least 0.2 μmols/g. Also preferably, the uppermost limit of the content of the carboxylic acid (B) is at most 3 μmol/g, more preferably at most 2 μmol/g, most preferably at most 1 μmol/g.

One embodiment of the invention is an EVOH resin composition containing from 500 to 2000 ppm, in terms of the metal, of an alkali metal salt (A) and from 0.05 to 4.5 μmols/g of a carboxylic acid (B), where the ratio of the content (μmol/g) of a carboxylic acid (b1) having a molecular weight of at least 75 and its salt to the total content (μmol/g) of the carboxylic acid (B) and its salt is at least 0.1. In the resin composition, the ratio of the content (μmol/g) of a carboxylic acid (b1) having a molecular weight of at least 75 and its salt to the total content (μmol/g) of the carboxylic acid (B) and its salt is at least 0.1. If the ratio is smaller than 0.1, the resin composition will stink, and its long-run workability is poor. Preferably, the lowermost limit of the ratio of the content (μmol/g) of a carboxylic acid (b1) having a molecular weight of at least 75 and its salt to the total content (μmol/g) of the carboxylic acid (B) and its salt is at least 0.5, more preferably at least 0.7, even more preferably at least 0.9, most preferably. at least 0.98.

As mentioned above, the discoloration resistance of the resin composition is improved, as containing a carboxylic acid (B); and the interlayer adhesiveness thereof is much improved, as containing at least 500 ppm of an alkali metal salt (A). However, adding too much a carboxylic acid (B) to the resin composition will lower the interlayer adhesiveness of the composition; and adding too much an alkali metal salt (A) will lower the discoloration resistance of the composition. In particular, since the EVOH resin composition of the invention contains a larger amount of an alkali metal salt (A) than ordinary EVOH resin compositions, its moldings will be much discolored and will have many gels and fish eyes. By suitably controlling the content of the carboxylic acid (B) in the resin composition to thereby make the resin composition have a pH falling within a predetermined range, the resin moldings could be effectively prevented from being discolored and from having gels and fish eyes. Accordingly, in the EVOH resin composition of the invention, it is desirable that the content (μmol/g, in terms of the metal) of the alkali metal salt (A) is from 10 to 100 times the content (μmol/g) of the carboxylic acid (B). Preferably, the lowermost limit of the content (μmol/g, in terms of the metal) of the alkali metal salt (A) in the resin composition is at least 15 times the content (μmol/g) of the carboxylic acid (B), more preferably at least 20 times. Also preferably, the uppermost limit of the content (μmol/g, in terms of the metal) of the alkali metal salt (A) is at most 90 times the content (μmol/g) of the carboxylic acid (B), more preferably at most 80 times. If the content of the alkali metal salt (A) is smaller than 10 times the content of the carboxylic acid (B), the adhesiveness of the resin composition especially to adhesive resins for nylons (these have poor adhesiveness to EVOH) will be poor; but if larger than 100 times, the resin composition will greatly discolor when it is melted.

In case where the ratio of the content (μmol/g) of a carboxylic acid (b1) having a molecular weight of at least 75 and its salt to the total content (μmol/g) of the carboxylic acid (B) and its salt in the resin composition is smaller than 0.1, the resin composition must indispensably contain a phosphate compound (C). In that case, the EVOH resin composition of the invention shall contain from 500 to 2000 ppm, in terms of the metal, of an alkali metal salt (A), from 10 to 500 ppm of a carboxylic acid (b2) having a molecular weight of smaller than 75, and from 10 to 500 ppm, in terms of the phosphate radical, of a phosphate compound (C).

In the EVOH resin composition of that type of the invention, the content of the carboxylic acid (b2) having a molecular weight of smaller than 75 falls between 10 and 500 ppm. In case where the carboxylic acid (b2) having a molecular weight of smaller than 75 therein is acetic acid, its content falls between 0.17 and 8.33 μmol/g. If, in the resin composition, the content of the carboxylic acid (b2) having a molecular weight of smaller than 75 is smaller than 10 ppm, the composition will greatly discolor when it is melted; but if larger than 500 ppm, the adhesiveness of the composition to adhesive resins will be poor when the composition is molded through co-extrusion. Preferably, the lowermost limit of the content of the carboxylic acid (b2) having a molecular weight of smaller than 75 is at least 30 ppm, more preferably at least 50 ppm. Also preferably, the uppermost limit of the content of the carboxylic acid (b2) having amolecular weight of smaller than 75 is at most 300 ppm, more preferably at most 200 ppm, even more preferably at most 150 ppm.

In one embodiment of the EVOH resin composition containing from 500 to 2000 ppm, in terms of the metal, of an alkali metal salt (A), from 10 to 500 ppm of a carboxylic acid (b2) having a molecular weight of smaller than 75, and from 10 to 500 ppm, in terms of the phosphate radical, of a phosphate compound (C), it is desirable that the content (ppm, in terms of the metal) of the alkali metal salt (A) is from 3 to 20 times the content (ppm) of the carboxylic acid (b2) having a molecular weight of smaller than 75. Since the EVOH resin composition of the invention contains a larger amount of an alkali metal salt than ordinary EVOH resin compositions, its moldings will be much discolored and will have many gels and fish eyes. By suitably controlling the content of the carboxylic acid (b2) having a molecular weight of smaller than 75 in the resin composition to thereby make the resin composition have a pH falling within a predetermined range, the resin moldings could be effectively prevented from being discolored and from having gels and fish eyes. Accordingly, in the EVOH resin composition of the invention, the content (ppm, in terms of the metal) of the alkali metal salt (A) is preferably at least 4 times the content (ppm) of the carboxylic acid (b2) having a molecular weight of smaller than 75, more preferably at least 5 times, even more preferably at least 5.5 times. Also preferably, the content (ppm, in terms of the metal) of the alkali metal salt (A) in the resin composition is at most 10 times the content (ppm) of the carboxylic acid (b2) having a molecular weight of smaller than 75, more preferably at most 7.5 times. If the content of the alkali metal salt (A) is smaller than 3 times the content of carboxylic acid (b2), the adhesiveness of the resin composition especially to adhesive resins for nylons (these have poor adhesiveness to EVOH) will be poor; but if larger than 20 times, the resin composition will greatly discolor when it is melted.

In case where the ratio of the content (μmol/g) of a carboxylic acid (b1) having a molecular weight of at least 75 and its salt to the total content (μmol/g) of the carboxylic acid (B) and its salt in the resin composition is smaller than 0.1, the resin composition must indispensably contain from 10 to 500 ppm, in terms of the phosphate radical, of a phosphate compound (C). The phosphate compound (C) includes, for example, various acids such as phosphoric acid, phosphorous acid, etc., and their salts, but is not limited to them. Any phosphate of any type of primary phosphates, secondary phosphates and tertiary phosphates may be in the resin composition, and its cation is not specifically defined. Preferred are alkali metal salts and alkaline earth metal salts such as those mentioned above. Above all, especially preferred is any of sodium dihydrogenphosphate, potassium dihydrogenphosphate, disodium hydrogenphosphate or dipotassium hydrogenphosphate for the phosphate compound (C) to be in the resin composition; and more preferred is sodium dihydrogenphosphate or potassium dihydrogenphosphate.

The EVOH resin composition of the invention contains a larger amount of an alkali metal salt than ordinary EVOH resin compositions. Therefore, in case where the ratio of the content ($\mu$mol/g) of a carboxylic acid (b1) having a molecular weight of at least 75 and its salt to the total content ($\mu$mol/g) of the carboxylic acid (B) and its salt in the EVOH resin composition of the invention is smaller than 0.1, the resin moldings will much discolor and will have many gels and fish eyes if a phosphate compound (C) is not suitably added to the resin composition. The effect of the phosphate compound (C) to solve the problem is especially remarkable when the resin composition is molded in long-run working lines and when the resin moldings are recycled. Preferably, the lowermost limit of the content of the phosphate compound (C) in the resin composition is at least 50 ppm in terms of the phosphate radical, more preferably at least 70 ppm; and the uppermost limit thereof is preferably at most 300 ppm, more preferably at most 200 ppm. Containing a phosphate compound (C) within the defined range, the EVOH resin composition will be more effectively prevented from being discolored and gelled. If the content of the phosphate compound (C) in the resin composition is smaller than 10 ppm, the resin composition will much discolor when it is molded in melt and the resin moldings will have poor appearances. In particular, the problem with the resin composition is more serious when the composition is subjected to repeated heat history. Accordingly, the recyclability of the resin composition in which the content of the phosphate compound (C) is too small is poor. If, on the contrary, the content of the phosphate compound (C) in the resin composition is larger than 500 ppm, the resin moldings will have many gels and fish eyes and their appearances will be poor.

On the other hand, in case where the ratio of the content ($\mu$mol/g) of a carboxylic acid (b1) having a molecular weight of at least 75 and its salt to the total content ($\mu$mol/g) of the carboxylic acid (B) and its salt in the resin composition is at least 0.1, adding a phosphate compound (C) to the resin composition is not indispensable. This is because, in the resin composition of that type, the content of the carboxylic acid (b1) having a molecular weight of at least 75 and its salt, which generally have a high boiling point, could be within a suitable range. Even though the resin composition does not contain a phosphate compound (C), it could have good discoloration resistance and its moldings could have good appearances even when molded in long-run melt-molding lines. In addition, in view of the production costs and the productivity, the absence of a phosphate compound (C) in the resin composition will be often desirable. However, adding a phosphate compound (C) to the resin composition will further improve the long-run workability and the recyclability of the resin composition. Preferably, the lowermost limit of the content of the phosphate compound (C) in the resin composition is at least 10 ppm in terms of the phosphate radical, more preferably at least 20 ppm, even more preferably at least 50 ppm. Also preferably, the uppermost limit of the content is at most 300 ppm, more preferably at most 200 ppm. Containing a phosphate compound (C) within the defined range, the EVOH resincomposition will be more effectively prevented from being discolored and gelled, and its recyclability will be improved more. However, if the content of the phosphate compound (C) in the resin composition is larger than 500 ppm, the resin moldings will have many gels and fish eyes and their appearances will be poor.

To further improve the long-run workability and the melt moldability of the EVOH resin composition of the invention, a boron compound (D) is preferably added thereto. The EVOH resin composition containing a boron compound (D) could have increased melt viscosity even when EVOH therein has a low degree of polymerization. The advantage of the EVOH resin composition in which EVOH has a low degree of polymerization is that it can be molded into better moldings with fewer gels and fish eyes and it has better long-run workability than ordinary EVOH resin compositions. The reason why the melt viscosity of the EVOH resin composition in which EVOH has a low degree of polymerization is increased by adding a boron compound (D) thereto is not clear. We, the present inventors have investigated the matter in detail, and have noted that adding a boron compound (D) to EVOH results in further reduction in the adhesiveness of EVOH to adhesive resins having poor adhesiveness to EVOH (for example, to adhesive resins for nylons).

Surprisingly, however, we have found that, even when a boron compound (D) is added to the EVOH resin composition of the invention, which contains from 500 to 2000 ppm, in terms of the metal, of an alkali metal salt (A) and from 0.05 to 4.5 $\mu$mols/g of a carboxylic acid (B), where the ratio of the content ($\mu$mol/g) of a carboxylic acid (b1) having a molecular weight of at least 75 and its salt to the total content ($\mu$mol/g) of the carboxylic acid (B) and its salt is at least 0.1, or to the EVOH resin composition of the invention, which contains from 500 to 2000 ppm, in terms of the metal, of an alkali metal salt (A), from 10 to 500 ppm of a carboxylic acid (b2) having a molecular weight of smaller than 75, and from 10 to 500 ppm, in terms of the phosphate radical, of a phosphate compound (C), then the resulting EVOH resin composition thus containing a boron compound (D) could still keep extremely high adhesiveness, and, in addition, adding such a boron compound (D) to the EVOH resin composition further improves the long-run workability and the melt moldability of the composition. The improvement in the adhesiveness of the resin composition is especially remarkable when a boron compound is added to the resin composition. To that effect, therefore, the meaning of the invention is great.

The boron compound (D) includes, for example, boric acids, esters of boric acids, salts of boric acids, boron hydrides, etc., but not limited to them. Concretely, the boric acids include orthoboric acid, metaboric acid, tetraboric acid, etc.; the esters of boric acids include triethyl borate, trimethyl borate, etc.; the salts of boric acids include alkali metal salts and alkaline earth metal salts of various types of boric acids such as those mentioned above, as well as borax, etc. Of those compounds, especially preferred is orthoboric acid (this will be hereinafter referred to as boric acid). The content of the boron compound (D) to be in the resin composition of the invention preferably falls between 50 and 2000 ppm in terms of the boron element, more preferably between 50 and 1000 ppm. If the content is smaller than 50 ppm, adding such a small amount of a boric acid (D) will be ineffective for improving the long-run workability of the resin composition; but if larger than 2000 ppm, the resin composition will be readily gelled and its moldability will be poor.

The reason why adding a boron compound (D) to EVOH lowers the adhesiveness of EVOH is not clear. From the fact that adding a boron compound to an EVOH resin composition in which the content of an alkali metal salt (A) is smaller than 500 ppm in terms of the metal significantly lowers the adhesiveness of the resin composition, it is believed that the boron compound added will retard the effect of the alkali metal salt (A) that improves the adhesiveness of EVOH, for some reason. Therefore, in the EVOH resin composition to which a boron compound (D) is added, it is desirable that the lowermost limit of the content of the alkali metal salt (A) is larger than 500 ppm, more preferably at least 510 ppm, even more preferably at least 520 ppm, still more preferably at least 530 ppm.

As mentioned hereinabove, suitably adding a boron compound (D) to the resin composition effectively prevents the resin moldings from being discolored or from having gels and fish eyes; and suitably adding a carboxylic acid (B) thereto improve the discoloration resistance of the composition. However, adding too much carboxylic acid (B) thereto lowers the interlayer adhesiveness of the resin composition and promotes the formation of gels and fish eyes in the resin moldings. Therefore, in case where a boron compound (D) is added to the EVOH resin composition of the invention where the ratio of the content ($\mu$mol/g) of a carboxylic acid (b1) having a molecular weight of at least 75 and its salt to the total content ($\mu$mol/g) of the carboxylic acid (B) and its salt therein is at least 0.1, it is especially desirable that the content ($\mu$mol/g, in terms of the boron element) of the boron compound (D) in the resin composition is from 2 to 500 times the content ($\mu$mol/g) of the carboxylic acid (B). The lowermost limit of the content ($\mu$mol/g, in terms of the boron element) of the boron compound in the resin composition is preferably at least 10 times the content of the carboxylic acid (B), more preferably at least 20 times. The uppermost limit of the content ($\mu$mol/g, in terms of the boron element) of the boron compound therein is preferably at most 250 times the content of the carboxylic acid (B), more preferably at most 100 times. If the boron compound content is smaller than 2 times the carboxylic acid content, the effect of the boron compound for preventing gels and fish eyes in the resin moldings and for improving the long-run workability of the resin composition will be poor; but if larger than 500 times, the discoloration resistance of the resin composition will be poor.

Also preferably, an alkaline earth metal salt (E) is added to the EVOH resin composition of the invention. Containing an alkaline earth metal salt (E), the discoloration resistance of the resin composition will lower in some degree. However, when molded in melt, the resin composition containing an alkaline earth metal salt (E) will be prevented from being degraded under heat, and the amount of the thermally-degraded resin that may deposit around the dies of molding machines could be reduced. The alkaline earth metal salt (E) is not specifically defined, including, for example, magnesium salts, calcium salts, barium salts, beryllium salts, etc. Especially preferred are magnesium salts and calcium salts. The anion of the alkaline earth metal salt (E) is not also specifically defined. For it, preferred are acetate, phosphate and lactate anions; and more preferred are lactate and acetate anions. Preferably, the content of the alkaline earth metal salt (E) in the resin composition falls between 10 and 200 ppm in terms of the metal, more preferably between 10 and 100 ppm. If the content of the alkaline earth metal salt (E) is smaller than 10 ppm, the effect of the salt to improve the long-run workability of the resin composition will be poor; but if larger than 200 ppm, the resin composition will much discolor when it is melted.

Preferably, the melt flow rate (MFR) of EVOH for use in the invention falls between. 0.1 and 200 g/10 min, most preferably between 0.2 and 100 g/10 min. MFR is measured at 190° C. and under a load of 2160 g. For EVOH having a melting point of around 190° C. or above 190° C., its MFR is measured under a load of 2160 g at different temperatures not lower than its melting point. The data are plotted on a semi-logarithmic graph with the horizontal axis indicating the reciprocal of the absolute temperature and the vertical axis indicating the logarithm of the melt flow rate measured, and the value corresponding to 190° C. is extrapolated from the curve of the thus-plotted data.

It is desirable that the EVOH resin of the invention satisfies the following formula (1):

$$0.1 < MFRmax/MFR0 < 10 \tag{1}$$

wherein MFRmax indicates a maximum value of MFR (measured at 230° C. and under a load of 10.9 kg) of the resin composition having been subjected to heat treatment at 220° C. in a nitrogen atmosphere for a period of from 10 to 100 hours, and MFR0 indicates MFR (measured at 230° C. and under a load of 10.9 kg) of the resin composition not subjected to the heat treatment.

Preferably, the lowermost limit of the ratio MFRmax/MFR0 is at least 0.5, more preferably at least 0.7. Also preferably the uppermost limit of the ratio MFRmax/MFR0 is at most 8, more preferably at most 5. Satisfying the requirement, the resin composition of the invention could have more improved long-run workability. If the ratio MFRmax/MFR0 is smaller than 0.1, EVOH will gel in the composition and the resin moldings will have fish eyes; but if larger than 10, EVOH will decompose and will therefore gel so that the long-run workability of the resin composition will be poor.

The heat treatment of the resin composition is effected as follows: From 3 to 4 g of a sample of the resin composition is put into a stainless pipe (having an inner diameter of 2.2 cm, a length of 12.5 cm and a capacity of 50 cm$^3$), then the stainless pipe is fully purged with nitrogen gas, and the sample therein is heated at 220° C. To obtain its MFR, the resin composition is heated in a melt indexer at 230° C. for 6 minutes, and measured under a load of 10.9 kg.

If desired, the EVOH resin composition of the invention may be blended with different types of EVOHs each having a different degree of polymerization, a different ethylene content and a different degree of saponification. Also if desired, a suitable amount of various plasticizers, stabilizers, surfactants, colorants, UV absorbents, slip agents, antistatic agents, drying agents, crosslinking agents, metal salts, fillers, reinforcing agents such as various fibers, etc. may be added to the resin composition.

Also if desired, a suitable amount of any other thermoplastic resins may be added to the resin composition. Other thermoplastic resins that may be added to the resin composition include, for example, various types of polyolefins (e.g., polyethylene, polypropylene, poly-1-butene, poly-4-methyl-1-pentene, ethylene-propylene copolymers, copolymers of ethylene with $\alpha$-olefins having at least 4 carbon atoms, polyolefin-maleic anhydride copolymers, ethylene-vinyl ester copolymers, ethylene-acrylate copolymers, and also modified polyolefins prepared by graft-modifying such polymers and copolymers with unsaturated carboxylic acids or their derivatives, etc.), various types of nylons (e.g., nylon-6, nylon-6,6, nylon-6/6,6 copolymers, etc.), and also polyvinyl chlorides, polyvinylidene chlorides, polyesters, polystyrenes, polyacrylonitriles, polyurethanes, polyacetals, modified polyvinyl alcohol resins, etc.

The method of adding an alkali metal salt (A), a carboxylic acid (B), and optionally a phosphate compound (C), a boron compound (D) and an alkaline earth metal salt (E) to EVOH is not specifically defined. For example, employable are a method of dipping EVOH in a solution containing the compounds as above; a method of melting EVOH followed by mixing the EVOH melt with the compounds; and a method of dissolving EVOH in a suitable solvent followed by mixing the EVOH solution with the compounds.

Of those, preferred is the method of dipping EVOH in a solution of the compounds for more favorably ensuring the effect of the invention. The treatment for the method may be effected in any mode of batch operation or continuous operation. For the treatment, the morphology of EVOH is not limited, including, for example, powders, granules, spherical pellets, columnar pellets, chips, etc.

In the method where EVOH is dipped in a solution containing an alkali metal salt (A), a carboxylic acid (B), and optionally a phosphate compound (C), a boron compound (D) and an alkaline earth metal salt (E), the concentration of the alkali metal salt (A), carboxylic acid (B), and optionally phosphate compound (C), boron compound (D) and alkaline earth metal salt (E) to be in the solution is not specifically defined. The solvent for the solution is not also specifically defined. In view of its handlability, preferred is an aqueous solution. Preferably, the weight of the solution in which EVOH is dipped is at least 3 times, more preferably at least 20 times the dry weight of EVOH. The dipping time will vary, depending on the morphology of EVOH, but is preferably not shorter than 1 hour, more preferably not shorter than 2 hours, for chips of EVOH having a size of from 1 to 10 mm or so.

Regarding the dipping treatment of EVOH in the solution of the compounds, EVOH may be dipped in a plurality of different solutions separately containing any of the compounds, or may be dipped in one solution containing all the compounds. In particular, especially preferred is dipping EVOH in one solution containing all of an alkali metal salt (A) and a carboxylic acid (B) (and optionally a phosphate compound (C), a boron compound (D) and an alkaline earth metal salt (E)), as the treatment in that manner is simple. After having been dipped in the solution, EVOH is finally dried and the intended EVOH composition is thus obtained.

The EVOH resin composition thus obtained in the manner as above is molded in melt into various moldings such as films, sheets, containers, pipes, fibers, etc. The moldings can be recycled by grinding and re-molding them. The films, sheets and fibers of the composition may be uniaxially or biaxially stretched. For molding the composition in melt, employable is any mode of extrusion, inflation extrusion, blow molding, melt spinning, injection molding, etc. The temperature at which the resin composition to be molded is melted varies, depending on the melting point of EVOH in the composition, but preferably falls between 150 and 270° C. or so.

The EVOH resin composition of the invention may be molded into single-layered moldings of the composition alone, but, in practical use, it is often molded into multi-layered structures comprising at least one layer of the composition in which the layer of the composition may be in any form of film, sheet or the like. The layer constitution of the multi-layered structures includes, for example, E/Ad/T, T/Ad/E/Ad/T, etc., in which E indicates the EVOH resin composition of the invention, Ad indicates an adhesive resin, and T indicates a thermoplastic resin. However, these are not limitative. In the multi-layered structures, each layer may be single-layered, or, as the case may be, multi-layered.

The method of producing the multi-layered structures as above is not specifically defined. For example, employable are a method of melt-extruding a thermoplastic resin onto a molding (e.g., film, sheet, etc.) of the EVOH resin composition; a method of co-extruding the EVOH resin composition along with any other thermoplastic resin, etc.; a method of co-injecting the EVOH resin composition along with any other thermoplastic resin; a method of laminating films or sheets of a molding of the EVOH resin composition and any other substrate via a known adhesive of, for example, organotitanium compounds, isocyanate compounds, polyester compounds and the like, therebetween. Of those, preferred is the method of co-extruding the EVOH resin composition along with any other thermoplastic resin. As having extremely excellent interlayer adhesiveness, the EVOH resin composition of the invention is favorable to co-extrusion molding and to co-extruded multi-layered structures comprising it.

The thermoplastic resin that may be laminated with the EVOH resin composition of the invention includes, for example, homopolymers or copolymers of olefins such as linear low-density polyethylenes, low-density polyethylenes, middle-density polyethylenes, high-density polyethylenes, ethylene-vinyl acetate copolymers, ethylene-propylene copolymers, polypropylenes, propylene-α-olefin copolymers (in which the α-olefin has from 4 to 20 carbon atoms), polybutenes, polypentenes, etc.; polyesters such as polyethylene terephthalates, etc.; polyester elastomers; polyamide resins such as nylon-6, nylon-6,6, etc.; as well as polystyrenes, polyvinyl chlorides, polyvinylidene chlorides, acrylic resins, vinyl ester resins, polyurethane elastomers, polycarbonate, chloropolyethylenes, chloropolypropylenes, etc. Of those, preferred are polypropylenes, polyethylenes, ethylene-propylene copolymers, ethylene-vinyl acetate copolymers, polyamides, polystyrenes, and polyesters.

In case where the EVOH resin composition of the invention is layered with a thermoplastic resin, an adhesive resin may be used therebetween. In that case, the adhesive resin preferably comprises a carboxylic acid-modified polyolefin. The carboxylic acid-modified polyolefin is preferably a carboxyl group-having, modified olefinic polymer that may be prepared by chemically bonding an ethylenic unsaturated carboxylic acid or its anhydride to an olefinic polymer, for example, through addition reaction or grafting reaction. The olefinic polymer includes, for example, polyolefins such as polyethylenes (produced in low-pressure, middle-pressure or high-pressure process), linear low-density polyethylenes, polypropylenes, polybutenes, etc.; copolymers of olefins with comonomers capable of copolymerizing with olefins (e.g., vinyl esters, unsaturated carboxylates, etc.), such as ethylene-vinyl acetate copolymers, ethylene-ethyl acrylate copolymers, etc. Of those, preferred are linear low-density polyethylenes, ethylene-vinyl acetate copolymers (having a vinyl acetate content of from 5 to 55% by weight), and ethylene-ethyl acrylate copolymers (having an ethyl acrylate content of from 8 to 35% by weight); and more preferred are linear-low density polyethylenes and ethylene-vinyl acetate copolymers. The ethylenic unsaturated carboxylic acid and its anhydride include, for example, ethylenic unsaturated monocarboxylic acids and their esters, ethylenic unsaturated dicarboxylic acids and their mono- or di-esters and anhydrides. Of those, preferred are ethylenic unsaturated dicarboxylic acid anhydrides. Concretely, they include maleic acid, fumaric acid, itaconic acid, maleic anhydride, itaconic anhydride, monomethyl maleate, monoethyl maleate, diethyl maleate, monomethyl fumarate, etc. Above all, most preferred is maleic anhydride.

The amount of the ethylenic unsaturated carboxylic acid or its anhydride to be added to or grafted on the olefinic polymer (that is, the degree of modification of the polymer) may fall between 0.0001 and 15% by weight of the olefinic polymer, but preferably between 0.001 and 10% by weight. Addition reaction or grafting reaction of the ethylenic unsaturated carboxylic acid or its anhydride to the olefinic polymer may be effected, for example, through radical polymerization in a solvent (e.g., xylene, etc.) in the presence of a catalyst (e.g., peroxide, etc.). The melt flow rate (MFR) of the thus-prepared, carboxylic acid-modified polyolefin, when measured at 190° C., preferably falls between 0.2 and 30 g/10 min, more preferably between 0.5 and 10 g/10 min. The adhesive resins may be used either singly to be a single layer or as combined to be two or more layers.

Of ordinary adhesive resins as above, those for nylons which could not be used in multi-layered structures with EVOH, especially in co-extruded multi-layered structures with EVOH as their adhesiveness to EVOH is poor, can be used in the multi-layered structures comprising the EVOH resin composition of the invention. To that effect, the meaning of the invention is great. Now that the EVOH resin composition having the advantages as above has been provided by the invention, the latitude in choosing the adhesive resins applicable to co-extrusion molding of EVOH has been enlarged. Needless-to-say, the EVOH resin composition of the invention has extremely high adhesiveness to ordinary adhesive resins for EVOH. Therefore, the thickness of the adhesive resin layer to be in the multi-layered structures comprising a layer of the EVOH resin composition of the invention can be reduced than that in conventional EVOH multi-layered structures, without interfering with the properties of the structures. Also to that effect, the meaning of the invention is great.

For co-extruding the resin composition of the invention along with a thermoplastic resin, for example, employable is any of a multi-manifold flow-combining T-die process, a feed block flow-combining T-die process, or an inflation process.

The thus-obtained, co-extruded multi-layered structures can be fabricated into various moldings (e. g., films, sheets, tubes, bottles, etc.), which include, for example, the following:

(1) Multi-layered, co-stretched sheets or films, which are produced by uniaxially or biaxially stretching multi-layered structures (e.g., sheets, films, etc.), or biaxially stretching them, and thereafter thermally fixing them.

(2) Multi-layered rolled sheets or films, which are produced by rolling multi-layered structures (e.g., sheets, films, etc.).

(3) Multi-layered tray or cup containers, which are produced through vacuum forming, pressure forming, vacuum-pressure forming or isothermal forming of multi-layered structures (e.g., sheets, films, etc.).

(4) Multi-layered bottle or cup containers, which are produced through stretch blow molding of multi-layered structures (e.g., pipes, etc.).

The method for fabricating the multi-layered structures of the invention is not limited to the above, and any other known fabricating methods (e.g., blow molding, etc.) could apply to the structures.

The co-extruded multi-layered structures and the co-injected multi-layered structures obtained in the manner as above stink little, and have few fish eyes. In addition, they are transparent and have few streaks. Therefore, they are favorable to materials for containers for drinks and edibles, for example, for deep-drawn containers, cup containers, bottles, etc.

EXAMPLES

The invention is described in more detail with reference to the following Examples, which, however, are not intended to restrict the scope of the invention. Unless otherwise specifically indicated, "%" and "parts" referred to herein are all by weight. Water used herein is all ion-exchanged water.

(1) Quantitative Determination of Alkali Metal Salt (A) and Alkaline Earth Metal Salt (E) (Quantitative Determination of Na, K and Mg ions)

10 g of a sample of dry chips is put into 50 ml of an aqueous solution of 0.01 N hydrochloric acid, and stirred at 95° C. for 6 hours. After thus stirred, the aqueous solution is subjected to quantitative analysis through ion chromatography, and the amount of Na ions, K ions and Mg ions therein is quantitatively determined. The column used is Yokokawa Electric's ICS-C25, and the eluent used is an aqueous solution containing 5.0 mM tartaric acid and 1.0 mM 2,6-pyridinedicarboxylic acid. For the quantitative determination, used are calibration curves of aqueous solutions of sodium chloride, potassium chloride and magnesium chloride. From the data of Na ions, K ions and Mg ions thus obtained, the content of the alkali metal salt (A) and the alkaline earth metal salt (E) in the sample of dry chips is derived in terms of the metal.

(2-a) Quantitative Determination of the Content of Carboxylic Acid (B)

20 g of a sample of dry chips is put into 100 ml of ion-exchanged water, and extracted under heat at 95° C. for 6 hours. The resulting extract is subjected to acid-base titration with 1/50 N NaOH to determine the content of the carboxylic acid (B) in the sample, for which is used phenolphthalein serving as an indicator.

(2-b) Determination of the Ratio of the Content ($\mu$mol/g) of Carboxylic Acid (b1) Having a Molecular Weight of at Least 75 and its Salt to the Total Content ($\mu$mol/g) of Carboxylic Acid (B) and its Salt 20 g of a sample of dry chips is put into 100 ml of ion-exchanged water, and extracted under heat at 95° C. for 6 hours. The content of the acids (b1) and (B) and their salts in the resulting extract is determined through ion chromatography, for which the column used is Yokokawa Electric's SCS5-252 and the eluent used is an aqueous solution of 0.1% phosphoric acid. From the data, obtained is the ratio of the content ($\mu$mol/g) of the carboxylic acid (b1) having a molecular weight of at least 75 and its salt to the total content ($\mu$mol/g) of the carboxylic acid (B) and its salt in the sample.

(3) Quantitative Determination of Phosphate Ions 10 g of a sample of dry chips is put into 50 ml of an aqueous solution of 0.01 N hydrochloric acid, and stirred at 95° C. for 6 hours. After thus stirred, the aqueous solution is subjected to quantitative analysis through ion chromatography, and the amount of phosphate ions therein is quantitatively determined. The column used is Yokokawa Electric's ICS-A23, and the eluent used is an aqueous solution containing 2.5 mM sodium carbonate and 1.0 mM sodium hydrogencarbonate. For the quantitative determination, used is calibration curve of an aqueous solution of sodium dihydrogenphosphate. From the data, obtained is the content, in terms of the phosphate radical, of the phosphate compound (C) in the sample.

(4) Quantitative Determination of Boron Compound (D)

100 g of a sample of dry chips is put into a ceramic crucible, and ashed in an electric furnace. The resulting ash is dissolved in 200 ml of an aqueous solution of 0.01 N nitric acid, and subjected to atomic absorption analysis to thereby determine the content, in terms of the boron element, of the boron compound (D) in the sample.

(5) Adhesiveness

A fresh sample of a three-kind five-layered film prepared through co-extrusion molding is tested through autograph (rate of pulling: 250 mm/min) for the 90-degree peeling strength between the EVOH layer and the adhesive resin layer, at 20° C. and 65% RH. From the data of the peeling strength thus obtained, the interlayer adhesiveness of the sample is evaluated according to the criteria mentioned below.

A: Over 1000 g/15 mm.

B: From 700 to 1000 g/15 mm.

C: From 400 to 700 g/15 mm.

D: Smaller than 400 g/15 mm.

(6) Test for Forming Single-layered Film (6-a) Fish Eyes

A sample of dry EVOH chips is molded into a single-layered film in a continuous molding line. One hour after the start of the molding operation, the film formed is sampled and checked for gel-like fish eyes (having a macroscopically detectable size of larger than about 100 μm). The number of the gel-like fish eyes seen on the film is counted. From the number, per 1.0 m$^2$, of the thus-counted number of the gel-like fish eyes, the fish eye resistance of the sample is evaluated according to the criteria mentioned below.

A: Smaller than 20.

B: From 20 to 40.

C: From 40 to 60.

D: Over 60.

(6-b) Long-run Workability

A sample of dry EVOH chips is molded into a single-layered film in a continuous molding line. Eight hours after the start of the molding operation, the film formed is sampled and checked for gel-like fish eyes (having a macroscopically detectable size of larger than about 100 μm). The number of the gel-like fish eyes seen on the film is counted. From the number, per 1.0 m$^2$, of the thus-counted number of the gel-like fish eyes, the fish eye resistance of the sample is evaluated according to the criteria mentioned below.

A: Smaller than 20.

B: From 20 to 40.

C: From 40 to 60.

D: Over 60.

(6-c) Resin Deposition Round Die

A sample of dry EVOH chips is molded into a single-layered film in a continuous molding line. Eight hours after the start of the molding operation, the molding line is stopped. The EVOH resin in the extruder is substituted with LDPE having MI of 1, which takes one hour. The weight of the thermally-degraded EVOH resin having deposited around the die is measured. From the data, the resin deposition resistance of the sample is evaluated according to the criteria mentioned below.

A: Smaller than 1 g.

B: From 1 to 5 g.

C: From 5 to 10 g.

D: Over 10 g.

(7) Discoloration Resistance 8 g of a sample of dry chips is sandwiched between hot plates (Shindo's desktop test press YS-5) heated at 230° C. with the hot plates being spaced from each other by 5 mm. In that condition, the sample is heated for 10 minutes. After having been thus heated, the degree of discoloration of the sample is macroscopically evaluated according to the criteria mentioned below.

A: Colorless.

B: Slightly yellowed.

C: Visibly yellowed.

D: Greatly yellowed.

(8) Recyclability

A sample of a single-layered EVOH film (this is sampled within 2 hours after the start of the molding operation in a continuous molding line) is milled, melted and again pelletized (at 220° C.). The pellets are molded into a film in the same manner as previously.

(8-a) Yellowing Resistance

The film is wound up around a paper board tube, and the rolled film is macroscopically checked for the degree of yellowing at its edges. The yellowing resistance of the film is evaluated according to the criteria mentioned below.

A: Colorless.

B: Slightly yellowed.

C: Visibly yellowed.

D: Greatly yellowed.

(8-b) Fish Eyes

One hour after the start of the molding operation, the film formed is sampled and checked for gel-like fish eyes (having a macroscopically detectable size of larger than about 100 μm). The number of the gel-like fish eyes seen on the film is counted. From the number, per 1.0 m$^2$, of the thus-counted number of the gel-like fish eyes, the fish eye resistance of the sample is evaluated according to the criteria mentioned below.

A: Smaller than 20.

B: From 20 to 40.

C: From 40 to 60.

D: Over 60.

(9) Intrinsic Viscosity 0.20 g of EVOH chips to be tested are sampled, and dissolved in 40 ml of aqueous phenol (water/phenol=15/85 wt. %) under heat at 60° C. over a period of 3 to 4 hours, and the viscosity of the resulting solution is measured with an Ostwald viscometer (t0=90 seconds). According to the following formula, the intrinsic (limiting) viscosity [η] of the sample is obtained.

[η]=(2×(ηsp−lnηrel))$^{1/2}$/C (l/g),

ηsp=t/t0−1 (specific viscosity),

ηrel=t/t0 (relative viscosity),

C: concentration of EVOH (g/l), t0: time taken by the blank (aqueous phenol) to pass through the viscometer, t: time taken by the sample-containing aqueous phenol to pass through the viscometer.

(10) Odor 20 g of a sample of EVOH chips is put into a 100-ml glass tube, and sealed with aluminium foil. This is heated at 150° C. for 90 minutes in a hot air drier. After taken out of the drier, this is left cooled at room temperature for 1 hour. The sample tube is shaken two or three times. The aluminium foil is removed, and the sample in the tube is sniffed. The odor of the sample is evaluated according to the criteria mentioned below.

A: No smell.

B: Slightly stank.

C: Stank.

D: Greatly Stank.

Example 1-1

A 45% solution in methanol of ethylene-vinyl acetate copolymer having an ethylene content of 38 mol % was put into a reactor for saponification, to which was added a solution of sodium hydroxide in methanol (80 g/liter), the amount of sodium hydroxide added being 0.4 equivalents to the vinyl acetate moiety of the copolymer. Then, methanol was added thereto to make the solution have a copolymer concentration of 20%. This was heated up to 60° C. and reacted for about 4 hours with nitrogen gas being introduced into the reactor. After 4 hours, this was neutralized with acetic acid to stop the reaction. This was extruded out into water through a die having a circular opening, solidified therein and cut into chips each having a diameter of about 3 mm and a length of about 5 mm. The resulting chips were dewatered in a centrifuge. A large amount of water was added thereto, and the chips were again dewatered. This operation was repeated.

3.5 kg of the wet chips of ethylene-vinyl alcohol copolymer thus obtained were dipped in 13 liters of an aqueous solution containing lactic acid (0.03 g/liter), sodium lactate (2 g/liter) and boric acid (0.35 g/liter) at 25° C. for 6 hours. After having been thus dipped, the chips were dewatered, and dried at 80° C. for 3 hours and then at 107° C. for 24 hours in a hot air drier. Thus were obtained dry chips.

The content of the carboxylic acid (B) in the dry chips was 0.33 μmol/g, the total content of the carboxylic acid (B) and its salt therein was 24.2 μmol/g (in this, the content of the carboxylic acid (b1) having a molecular weight of at least 75 and its salt was 24.2 μmol/g), the content of the alkali metal salt was 550 ppm in terms of the metal, and the content of the boron compound was 280 ppm in terms of the boron element. MFR of the sample was 1.7 g/10 min.

Using the dry chips obtained herein, a three-kind five-layered co-extrusion film of LLDPE/adhesive resin/EVOH composition/adhesive resin/LLDPE (thickness: 50/10/10/10/50 μm) was molded.

LLDPE used herein is Mitsui Chemical's Ultozex 3520L (MI=2.1 g/10 min, measured at 210° C. under a load of 2160 g); the adhesive resin is Mitsui Chemical's Admer NF308 (this is maleic anhydride-modified polyethylene for nylon adhesion, and its MI is 1.7 g/10 min, measured at 190° C. under a load of 2160 g). The extrusion temperature for the EVOH composition, LLDPE and adhesive resin was 220° C., 170° C. and 170° C., respectively; and the die temperature was 220° C. The details of the extruder for each resin and the T-die are as follows:

LLDPE: 32 φ extruder, GT-32-A Model (from Plastic Engineering Laboratory).

Adhesive resin: 25 φ extruder, P25-18AC (from Osaka Seiki).

EVOH: 20 φ extruder, laboratory-size ME Model CO-EXT (from Toyo Seiki).

T-die: for three-kind five-layer films having a width of 300 mm (from Plastic Engineering Laboratory).

The chill roll temperature was 50° C.; and the take-up speed was 4 m/min.

For its interlayer adhesiveness between EVOH/adhesive resin, the fresh sample of the film was evaluated as rank A.

On the other hand, the dry chips were molded into a single-layered EVOH film, and the film samples were tested for fish eyes, long-run workability and resin deposition around die. The L/D ratio of the screw used for molding the single-layered EVOH film was 20; and the compression ratio was 4.0.

The details of the extruder and the T-die used in the tests are as follows:

Extruder: single-screw extruder D20/20 (from Toyo Seiki).

T-die: straight hunger-type T-die having a width of 300 mm (from Toyo Seiki).

Extrusion temperature: C1/C2/C3/die=180/220/220/220° C.

For its fish eye resistance and long-run workability, the sample was evaluated both as rank A. For the resin deposition around die, the sample was evaluated as rank B.

The dry chips were tested for the discoloration resistance according to the method mentioned above. In the test, the sample was evaluated as rank A.

A sample of the single-layered film (this was sampled within 2 hours after the start of the molding operation) was tested for the recyclability (with respect to the yellowing resistance and the fish eye resistance) according to the methods mentioned above. In the recycle test, the sample was evaluated as rank A for both the yellowing resistance and the fish eye resistance.

The dry chips were tested for their odor according to the method mentioned above. In the test, the same was evaluated as rank A.

Examples 1-2 to 1-5, Comparative Examples 1-1 to 1-6

Dry chips were prepared in the same manner as in Example 1-1. In this, however, EVOH having an intrinsic viscosity as in Table 2 was used, and it was dipped in a processing solution indicated in Table 1. The composition of the dry chips is given in Table 2; and the test data are in Table 3.

TABLE 1

| | Processing Solution (lactic acid) | | | | | | |
|---|---|---|---|---|---|---|---|
| | Lactic Acid | Acetic Acid | Sodium Lactate | Sodium Acetate | Magnesium Lactate | Phosphorus Compound (KH$_2$PO$_4$) | Boron Compound (H$_3$BO$_3$) |
| Example 1-1 | 0.03 g/liter | 0 g/liter | 2 g/liter | 0 g/liter | 0 g/liter | 0 g/liter | 0.35 g/liter |
| Example 1-2 | 0.07 | 0 | 2.8 | 0 | 0 | 0 | 0.35 |
| Example 1-3 | 0.03 | 0 | 2 | 0 | 0 | 0 | 0 |
| Example 1-4 | 0.03 | 0 | 2 | 0 | 0.2 | 0 | 0.35 |
| Example 1-5 | 0.03 | 0.13 | 2 | 0 | 0 | 0 | 0.35 |

TABLE 1-continued

Processing Solution (lactic acid)

|  | Lactic Acid | Acetic Acid | Sodium Lactate | Sodium Acetate | Magnesium Lactate | Phosphorus Compound ($KH_2PO_4$) | Boron Compound ($H_3BO_3$) |
|---|---|---|---|---|---|---|---|
| Comp. Ex. 1-1 | 0.03 | 0 | 0.8 | 0 | 0 | 0 | 0.35 |
| Comp. Ex. 1-2 | 0.03 | 0 | 0.8 | 0 | 0 | 0 | 0 |
| Comp. Ex. 1-3 | 0.03 | 0 | 9.5 | 0 | 0 | 0 | 0.35 |
| Comp. Ex. 1-4 | 0.8 | 0 | 2 | 0 | 0 | 0 | 0.35 |
| Comp. Ex. 1-5 | 0 | 0 | 2 | 0 | 0 | 0 | 0.35 |
| Comp. Ex. 1-6 | 0.4 | 0 | 2.4 | 0 | 0.3 | 0.14 | 0.05 |

TABLE 2

Resin Composition (lactic acid)

| | Alkali Metal Salt (A) (ppm) | Carboxylic Acid (B) (µmol/g) | Total Content of carboxylic acid (B) and its salt (*1) (µmol/g) | Content of carboxylic acid (b1) having MW of at least 75 and its salt (*2) (µmol/g) | *2/*1 | Phosphate Compound (C) (ppm) | Boron Compound (D) (ppm) | Alkaline Earth Metal Salt (E) (ppm) | Intrinsic Viscosity (l/g) | (A)/(B) (ratio in µmol/g) | (D)/(B) (ratio in µmol/g) | MFRmax/MFR0 |
|---|---|---|---|---|---|---|---|---|---|---|---|---|
| Ex. 1-1 | 550 | 0.33 | 24.2 | 24.2 | 1 | 0 | 280 | 0 | 0.085 | 72 | 77 | 1 |
| Ex. 1-2 | 700 | 0.56 | 31 | 31 | 1 | 0 | 270 | 0 | 0.085 | 54 | 44 | 0.8 |
| Ex. 1-3 | 550 | 0.33 | 24.2 | 24.2 | 1 | 0 | 0 | 0 | 0.112 | 72 | 0 | 1 |
| Ex. 1-4 | 550 | 0.33 | 26.7 | 26.7 | 1 | 0 | 280 | 30 | 0.085 | 72 | 77 | 8 |
| Ex. 1-5 | 550 | 1.33 | 25.2 | 24.2 | 0.96 | 0 | 280 | 0 | 0.085 | 18 | 19 | 1 |
| Co. Ex. 1-1 | 200 | 0.33 | 9.03 | 9.03 | 1 | 0 | 280 | 0 | 0.085 | 26 | 77 | 0.4 |
| Co. Ex. 1-2 | 200 | 0.33 | 9.03 | 9.03 | 1 | 0 | 0 | 0 | 0.112 | 26 | 0 | 0.4 |
| Co. Ex. 1-3 | 2200 | 0.33 | 96 | 96 | 1 | 0 | 280 | 0 | 0.085 | 290 | 77 | 5 |
| Co. Ex. 1-4 | 550 | 6.67 | 30.6 | 30.6 | 1 | 0 | 280 | 0 | 0.085 | 3.6 | 3.8 | 0.05 |
| Co. Ex. 1-5 | 550 | 0.03 | 23.9 | 23.9 | 1 | 0 | 280 | 0 | 0.085 | 800 | 850 | 2.5 |
| Co. Ex. 1-6 | 600 | 4.78 | 33 | 33 | 1 | 90 | 40 | 50 | 0.085 | 5.3 | 0.76 | 0.5 |

Notes:
Alkali metal salt (A) and alkaline earth metal salt (E) are in terms of the metal; phosphate compound (C) is in terms of the phosphate radical; boron compound (D) is in terms of the boron element.

TABLE 3

Test Data (lactic acid)

Test for Molding Single-layered Films

| | Adhesiveness | Fish Eyes | Long-run Workability | Resin Deposition around Die | Discoloration Resistance | Recyclability Yellowing Resistance | Fish Eyes | Odor |
|---|---|---|---|---|---|---|---|---|
| Example 1-1 | A | A | A | B | A | A | A | A |
| Example 1-2 | A | A | A | B | A | A | A | A |
| Example 1-3 | A | B | B | B | A | A | B | A |
| Example 1-4 | A | A | A | A | B | B | A | A |
| Example 1-5 | A | A | A | B | A | A | A | B |
| Co. Ex. 1-1 | C | A | A | B | A | A | A | A |
| Co. Ex. 1-2 | B | B | B | B | A | A | B | A |
| Co. Ex. 1-3 | A | B | C | B | D | D | B | A |
| Co. Ex. 1-4 | D | D | D | D | A | A | D | B |
| Co. Ex. 1-5 | A | B | B | B | D | D | C | A |
| Co. Ex. 1-6 | D | C | C | C | A | A | C | B |

Example 2-1

A 45% solution in methanol of ethylene-vinyl acetate copolymer having an ethylene content of 38 mol % was put into a reactor for saponification, to which was added a solution of sodium hydroxide in methanol (80 g/liter), the amount of sodium hydroxide added being 0.4 equivalents to the vinyl acetate moiety of the copolymer. Then, methanol was added thereto to make the solution have a copolymer concentration of 20%. This was heated up to 60° C. and reacted for about 4 hours with nitrogen gas being introduced into the reactor. After 4 hours, this was neutralized with acetic acid to stop the reaction. This was extruded out into water through a die having a circular opening, solidified therein and cut into chips each having a diameter of about 3 mm and a length of about 5 mm. The resulting chips were dewatered in a centrifuge. A large amount of water was added thereto, and the chips were again dewatered. This operation was repeated.

3.5 kg of the wet chips of ethylene-vinyl alcohol copolymer thus obtained were dipped in 13 liters of an aqueous solution containing acetic acid (0.20 g/liter), sodium acetate (1.31 g/liter), potassium dihydrogenphosphate (0.14 g/liter) and boric acid (0.35 g/liter) at 25° C. for 6 hours. After having been thus dipped, the chips were dewatered, and dried at 80° C. for 3 hours and then at 107° C. for 24 hours in a hot air drier. Thus were obtained dry chips.

The acetic acid content of the dry chips was 90 ppm; the alkali metal salt content thereof was 550 ppm in terms of the metal; and the phosphate compound content thereof was 80 ppm in terms of the phosphate radical. MI of the sample was 2.1 g/10 min.

Using the dry chips obtained herein, a three-kind five-layered co-extrusion film of LLDPE/adhesive resin/EVOH composition/adhesive resin/LLDPE (thickness: 50/10/10/10/50 μm) was molded.

LLDPE used herein is Mitsui Chemical's Ultozex 3520L (MI=2.1 g/10 min, measured at 210° C. under a load of 2160 g); the adhesive resin is Mitsui Chemical's Admer NF308 (this is maleic anhydride-modified polyethylene for nylon adhesion, and its MI is 1.7 g/10 min, measured at 190° C. under a load of 2160 g). The extrusion temperature for the EVOH composition, LLDPE and adhesive resin was 220° C., 170° C. and 170° C., respectively; and the die temperature was 220° C. The details of the extruder for each resin and the T-die are as follows:

LLDPE: 32 φ extruder, GT-32-A Model (from Plastic Engineering Laboratory).

Adhesive resin: 25 φ extruder, P25-18AC (from Osaka Seiki).

EVOH: 20 φ extruder, laboratory-size ME Model CO-EXT (from Toyo Seiki).

T-die: for three-resin five-layer films having a width of 300 mm (from Plastic Engineering Laboratory).

The chill roll temperature was 50° C.; and the take-up speed was 4 m/min.

For its interlayer adhesiveness between EVOH/adhesive resin, the fresh sample of the film was evaluated as rank A.

On the other hand, the dry chips were molded into a single-layered EVOH film, and the film samples were tested for fish eyes, long-run workability and resin deposition around die. The L/D ratio of the screw used for molding the single-layered EVOH film was 20; and the compression ratio was 4.0.

The details of the extruder and the T-die used in the tests are as follows:

Extruder: single-screw extruder D20/20 (from Toyo Seiki).

T-die: straight hunger-type T-die having a width of 300 mm (from Toyo Seiki).

Extrusion temperature: C1/C2/C3/die=180/220/220/220° C.

For its fish eye resistance and long-run workability, the sample was evaluated both as rank A. For the resin deposition around die, the sample was evaluated as rank B.

The dry chips were tested for the discoloration resistance and odor according to the methods mentioned above. In the tests, the sample was evaluated as rank A for the discoloration resistance, and as rank C for the odor.

A sample of the single-layered film (this was sampled within 2 hours after the start of the molding operation) was tested for the recyclability (with respect to the yellowing resistance (a) and the fish eye resistance (b)) according to the methods mentioned above. In the recycle test, the sample was evaluated as rank A both for the yellowing resistance (a) and the fish eye resistance (b).

Examples 2-2 to 2-5, Comparative Examples 2-1 to 2-7

Dry chips were prepared in the same manner as in Example 2-1. In this, however, EVOH having been obtained through saponification followed by washing and dewatering was dipped in a processing solution indicated in Table 4. The composition of the dry chips is given in Table 5; and the test data are in Table 6.

TABLE 4

| | Processing Solution (acetic acid) | | | | |
|---|---|---|---|---|---|
| | Acetic Acid | Sodium Acetate | Phosphate Compound ($KH_2PO_4$) | Boron Compound ($H_3BO_3$) | Magnesium Acetate |
| Example 2-1 | 0.2 g/liter | 1.32 g/liter | 0.14 g/liter | 0.35 g/liter | 0 g/liter |
| Example 2-2 | 0.3 | 1.98 | 0.14 | 0.35 | 0 |
| Example 2-3 | 0.2 | 1.32 | 0.14 | 0 | 0 |
| Example 2-4 | 0.4 | 2.64 | 0.14 | 0.35 | 0 |
| Example 2-5 | 0.2 | 1.32 | 0.14 | 0.35 | 0.14 |
| Comp. Ex. 2-1 | 0.3 g/liter | 1.32 g/liter | 0 g/liter | 0 g/liter | 0 g/liter |
| Comp. Ex. 2-2 | 0.2 | 1.32 | 0 | 0.35 | 0 |
| Comp. Ex. 2-3 | 0.2 | 0.35 | 0.14 | 0.35 | 0 |
| Comp. Ex. 2-4 | 0.2 | 0.35 | 0.14 | 0 | 0 |
| Comp. Ex. 2-5 | 0.3 | 7 | 0.14 | 0.35 | 0 |
| Comp. Ex. 2-6 | 3 | 1.32 | 0.14 | 0.35 | 0 |
| Comp. Ex. 2-7 | 0 | 1.32 | 0.14 | 0.35 | 0 |

TABLE 5

Resin Composition (acetic acid)

| | Alkali Metal Salt (A) (ppm) (*1) | Acetic Acid (b2) (ppm) | Phosphate Compound (C) (ppm) (*2) | Boron Compound (D) (ppm) (*3) | Alkaline Earth Metal Salt (E) (ppm) (*4) | (A)/(b2) | Intrinsic Viscosity (l/g) | MFRmax/-MFR0 |
|---|---|---|---|---|---|---|---|---|
| Ex. 2-1 | 550 | 90 | 80 | 280 | 0 | 6.1 | 0.085 | 1 |
| Ex. 2-2 | 660 | 100 | 80 | 270 | 0 | 6.6 | 0.085 | 1 |
| Ex. 2-3 | 550 | 100 | 80 | 0 | 0 | 5.5 | 0.112 | 1 |
| Ex. 2-4 | 830 | 120 | 80 | 260 | 0 | 6.9 | 0.085 | 1.5 |
| Ex. 2-5 | 550 | 90 | 80 | 280 | 30 | 6.1 | 0.085 | 8 |
| Co. Ex. 2-1 | 550 | 100 | 0 | 0 | 0 | 5.5 | 0.112 | 1.5 |
| Co. Ex. 2-2 | 550 | 90 | 0 | 280 | 0 | 6.1 | 0.085 | 1 |
| Co. Ex. 2-3 | 200 | 90 | 80 | 280 | 0 | 3.9 | 0.085 | 0.8 |
| Co. Ex. 2-4 | 200 | 90 | 80 | 0 | 0 | 3.9 | 0.112 | 0.8 |
| Co. Ex. 2-5 | 2500 | 100 | 80 | 280 | 0 | 25 | 0.085 | 2 |
| Co. Ex. 2-6 | 550 | 1000 | 80 | 280 | 0 | 0.5 | 0.085 | 0.05 |
| Co. Ex. 2-7 | 550 | 5 | 80 | 280 | 0 | 110 | 0.085 | 3 |

(*1), (*4): in terms of the metal.
(*2): in terms of the phosphate radical.
(*3): in terms of the boron element.

TABLE 6

Test Data (acetic acid)

| | Test for Molding Single-layered Films | | | | | Recyclability | |
|---|---|---|---|---|---|---|---|
| | Adhesiveness | Fish Eyes | Long-run Workability | Resin Deposition around Die | Discoloration Resistance | Yellowing Resistance (a) | Fish Eyes (b) |
| Example 2-1 | A | A | A | B | A | A | A |
| Example 2-2 | A | A | A | B | A | A | A |
| Example 2-3 | A | B | B | B | A | A | B |
| Example 2-4 | A | A | A | B | B | B | A |
| Example 2-5 | A | A | A | A | B | B | A |
| Co. Ex. 2-1 | A | B | B | B | C | C | C |
| Co. Ex. 2-2 | A | A | B | B | C | C | B |
| Co. Ex. 2-3 | C | A | A | B | A | A | A |
| Co. Ex. 2-4 | B | B | B | B | A | A | B |
| Co. Ex. 2-5 | A | B | C | B | D | D | B |
| Co. Ex. 2-6 | D | D | D | D | A | A | D |
| Co. Ex. 2-7 | A | B | B | B | D | D | C |

The EVOH resin compositions of the invention obtained in Examples 1-1 to 1-5 and in Examples 2-1 to 2-5 have extremely good adhesiveness, and their moldings have good appearances with few gels and fish eyes. In addition, the resin compositions all have good long-run workability and good recyclability, and the recycled resin compositions are yellowed little. In particular, the EVOH resin compositions obtained in Examples 1-1 to 1-5, in which the ratio of the content ($\mu$mol/g) of the carboxylic acid (b1) having a molecular weight of at least 75 and its salt to the total content ($\mu$mol/g) of the carboxylic acid (B) and its salt is at least 0.1, do not stink. As opposed to these, the adhesiveness of the EVOH resin compositions of Comparative Examples 1-1 and 1-2 is poor, since the content of the alkali metal salt (A) therein is smaller than 500 ppm in terms of the metal. The discoloration resistance of the EVOH resin composition of Comparative Example 1-3 is extremely bad, since the content of the alkali metal salt (A) therein is larger than 2000 ppm in terms of the metal. The adhesiveness of the EVOH resin compositions of Comparative Example 1-4 and Comparative Example 1-6(which represents Example of Japanese Patent Laid-Open No. 67898/1998) is poor, since the content of the carboxylic acid (B) therein is larger than 4.5 $\mu$mols/g; and the discoloration resistance of the EVOH resin composition of Comparative Example 1-5 is poor, since the content of the carboxylic acid (B) therein is smaller than 0.05 $\mu$mols/g.

The discoloration resistance and the recyclability of the EVOH resin compositions of Comparative Examples 2-1 and 2-2 are both extremely bad, since the ratio of the content ($\mu$mol/g) of the carboxylic acid (b1) having a molecular weight of at least 75 and its salt to the total content ($\mu$mol/g) of the carboxylic acid (B) and its salt therein is smaller than 0.1 and the content of the phosphate compound (C) therein is smaller than 10 ppm in terms of the phosphate radical. The adhesiveness of the EVOH resin composition of Comparative Example 2-3 that contains a boron compound is poor, since the content of the alkali metal salt (A) therein is smaller than 500 ppm in terms of the metal. Contrary to the object of the invention, the adhesiveness of the EVOH resin composition of Comparative Example 2-4 not containing a boron compound is not improved so much, since the content of the alkali metal salt (A) in the composition is smaller than 500 ppm in terms of the metal. In addition, the fish eye resistance, the long-run workability and the resin melt deposition resistance of the composition of Comparative Example 2-4 are not so much improved. The discoloration resistance and the recyclability of the EVOH resin composition of Comparative Example 2-5 in which the content of the alkali metal salt (A) is larger than 2000 ppm in terms of the metal are both extremely poor, and, in addition, the long-run workability thereof is not good. The fish eye resistance, the long-run workability and the resin melt deposition resistance of the EVOH resin composition of Comparative Example 2-6 of which the acetic acid content is larger than 500 ppm are all extremely poor, and the adhesiveness thereof is also extremely low. The discoloration resistance and the recyclability of the EVOH resin composition of Comparative Example 2-7 of which the acetic acid content is smaller than 10 ppm are both poor.

As described in detail hereinabove with reference to its embodiments, the invention provides an improved EVOH resin composition and a multi-layered structure comprising it. The resin composition has extremely good adhesiveness, and its moldings have good appearances with few gels and fish eyes. When molded, the resin composition ensures good long-run workability and recyclability, and the recycled resin composition is yellowed little. As having extremely good interlayer adhesiveness, the resin composition is extremely favorable to co-extrusion molding with substrates of polyolefins, etc.

While the invention has been described in detail and with reference to specific embodiments thereof, it will be apparent to one skilled in the art that various changes and modifications can be made therein without departing from the spirit and scope thereof.

What is claimed is:

1. A resin composition comprising an ethylene-vinyl alcohol copolymer which contains an alkali metal salt (A) in an amount of from 500 to 2000 ppm, in terms of the metal, and from 0.05 to 4.5 $\mu$mols/g of a carboxylic acid (B), where the ratio of the content ($\mu$mol/g) of a carboxylic acid (b1) having a molecular weight of at least 75 and its salt to the total content ($\mu$mol/g) of the carboxylic acid (B) and its salt is at least 0.1.

2. The resin composition as claimed in claim 1, wherein the carboxylic acid (b1) having a molecular weight of at least 75 is a hydroxycarboxylic acid.

3. The resin composition as claimed in claim 1, wherein the carboxylic acid (b1) having a molecular weight of at least 75 is a lactic acid.

4. The resin composition as claimed in claim 1, wherein the content ($\mu$mol/g in terms of the metal) of the alkali metal salt (A) is from 10 to 100 times the content ($\mu$mol/g) of the carboxylic acid (B).

5. The resin composition as claimed in claim 1, which additionally contains a boron compound (D) in an amount of from 50 to 2000 ppm, in terms of the boron element.

6. The resin composition as claimed in claim 1, which satisfies the following formula (1):

$$0.1 < MFRmax/MFR0 < 10 \qquad (1)$$

wherein MFRmax indicates a maximum value of MFR (measured at 230° C. and under a load of 10.9 kg) of the resin composition having been subjected to heat treatment at 220° C. in a nitrogen atmosphere for a period of from 10 to 100 hours, and MFR1 indicates MFR (measured at 230° C. and under a load of 10.9 kg) of the resin composition not subjected to the heat treatment.

7. A co-extrusion molding comprising the resin composition as claimed in claim 1.

8. A multi-layered structure comprising at least one layer of the resin composition of claim 1.

9. A resin composition comprising an ethylene-vinyl alcohol copolymer which contains an alkali metal salt (A) in an amount of from 500 to 2000 ppm, in terms of the metal, from 10 to 500 ppm of a carboxylic acid (b2) having a molecular weight of smaller than 75, and from 10 to 500 ppm of a phosphate compound (C), in terms of the phosphate radical thereof.

10. The resin composition as claimed in claim 9, wherein the carboxylic acid (b2) having a molecular weight of smaller than 75 is acetic acid.

11. The resin composition as claimed in claim 9, wherein the content (ppm in terms of the metal) of the alkali metal salt (A) is from 3 to 20 times the content (ppm) of the carboxylic acid (b2) having a molecular weight of smaller than 75.

12. The resin composition as claimed in claim 9, which additionally contains from 50 to 2000 ppm of a boron compound (D), in terms of the boron element.

13. The resin composition as claimed in claim 9, which satisfies the following formula (1):

$$0.1 < MFRmax/MFR0 < 10 \qquad (1)$$

wherein MFRmax indicates a maximum value of MFR (measured at 230° C. and under a load of 10.9 kg) of the resin composition having been subjected to heat treatment at 220° C. in a nitrogen atmosphere for a period of from 10 to 100 hours, and MFRO indicates MFR (measured at 230° C. and under a load of 10.9 kg) of the resin composition not subjected to the heat treatment.

14. A co-extrusion molding comprising the resin composition as claimed in claim 9.

15. A multi-layered structure comprising at least one layer of the resin composition of claim 9.

* * * * *